SAMUEL NATELSON
INVENTOR.

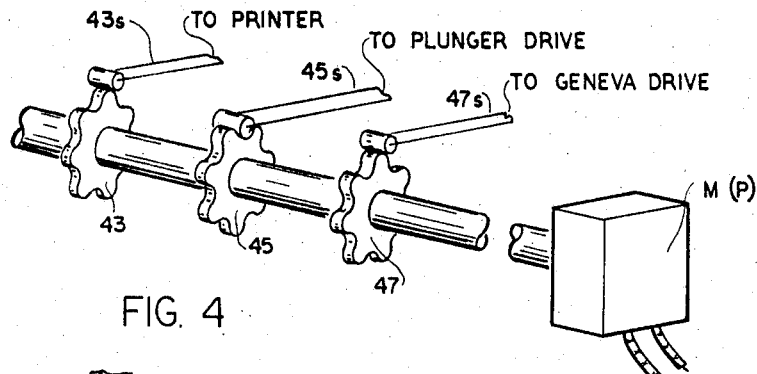
FIG. 4
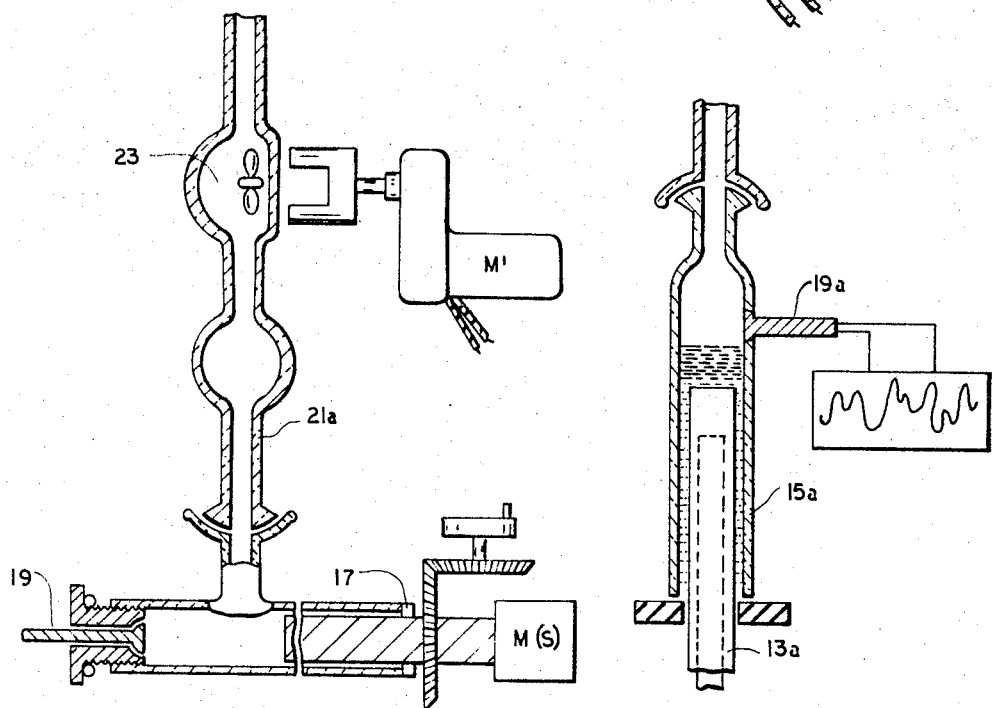
FIG. 3
FIG. 5

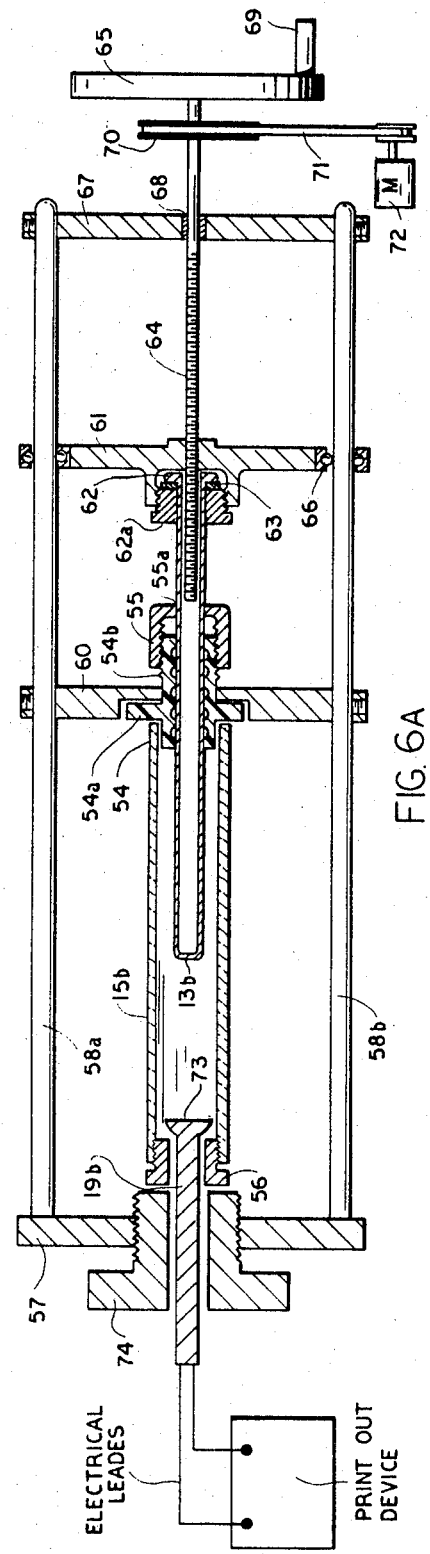
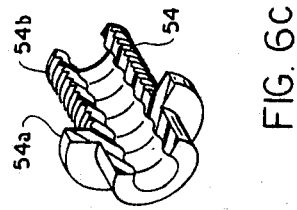
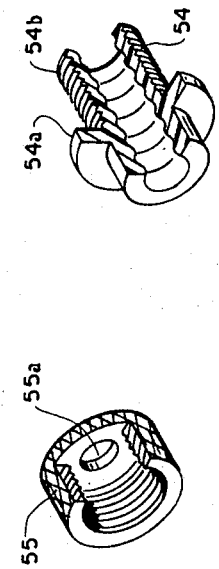

United States Patent Office 3,453,082
Patented July 1, 1969

3,453,082
AUTOMATIC ANALYSIS OF GASES
Samuel Natelson, Chicago, Ill., assignor to Scientific Industries, Inc., Queens Village, N.Y.
Continuation-in-part of application Ser. No. 289,680, June 21, 1963. This application July 3, 1967, Ser. No. 650,678
Int. Cl. G01n 7/04, 31/06
U.S. Cl. 23—253                    19 Claims

ABSTRACT OF THE DISCLOSURE

An instrument for automatically assaying the gas content of liquid samples having an automated moving arrangement with a plurality of sequentially disposed work locations some of which provide apertures to a reaction chamber and at least one of which contains a gas absorbent. These work locations are sequentially brought to a work station. The sample reaches the reaction chamber from the work location. The gas is separated from the liquid. The gas absorbent work location is then brought to the work station. Pressure changes in the reaction chamber are recorded and the difference in pressure is a measure of the gas absorbed.

---

The present invention is an outgrowth of U.S. Patent No. 2,680,060 and No. 3,171,722 as well as being a continuation-in-part of copending application Ser. No. 289,-680, filed June 21, 1963, now U.S. Patent No. 3,408,166, all by the present inventor, and, some of the glass components used in the present invention are also used in the instruments described in these prior patents and applications.

Background of the invention

The present invention relates to the analysis of gases contained in liquids and more particularly to the automatic assaying of gases such as carbon dioxide and oxygen which are present in large or very minute quantities in various substances such as blood, gasoline, alcohol, etc.

Blood gases have been determined by liberation of the gases and measuring their volume or their pressure at constant volume such as in macro and microgasometers. These methods are slow, time consuming, and tedious to the operator. Gas chromatography has also been used for this purpose. In this procedure it takes too long a time for the chromatogram to develop to be able to deal with the numerous tests required in a clinical laboratory. Titrimetric methods used are generally inaccurate and non-specific for the gases analyzed.

Broadly stated, the present invention provides an instrument where gases such as carbon dioxide and oxygen can be assayed for automatically without attendance of the operator during the analysis. For this purpose the most reliable procedure has been chosen. This procedure is the direct measurement of the gases by measuring their pressure at a fixed volume before and after they are absorbed into a chemical absorbent.

The invention as well as the objects and advantages thereof will become more apparent from the following detailed description taken in conjunction with the accompanying drawing.

Brief description of the several views of the drawing

FIG. 3 depicts the lower portion of the instrument shown in FIG. 1;

FIG. 4 is an illustration in perspective of the programming arrangement of the instrument contemplated herein;

FIG. 5 presents the type of instrument shown in FIG. 1 in a vertical mode showing a cross-sectional view of the lower portion thereof; and, FIGS. 6a, 6b, 6c, present a practical version of a portion of the apparatus shown in FIG. 1.

Detailed description

Figure 1:
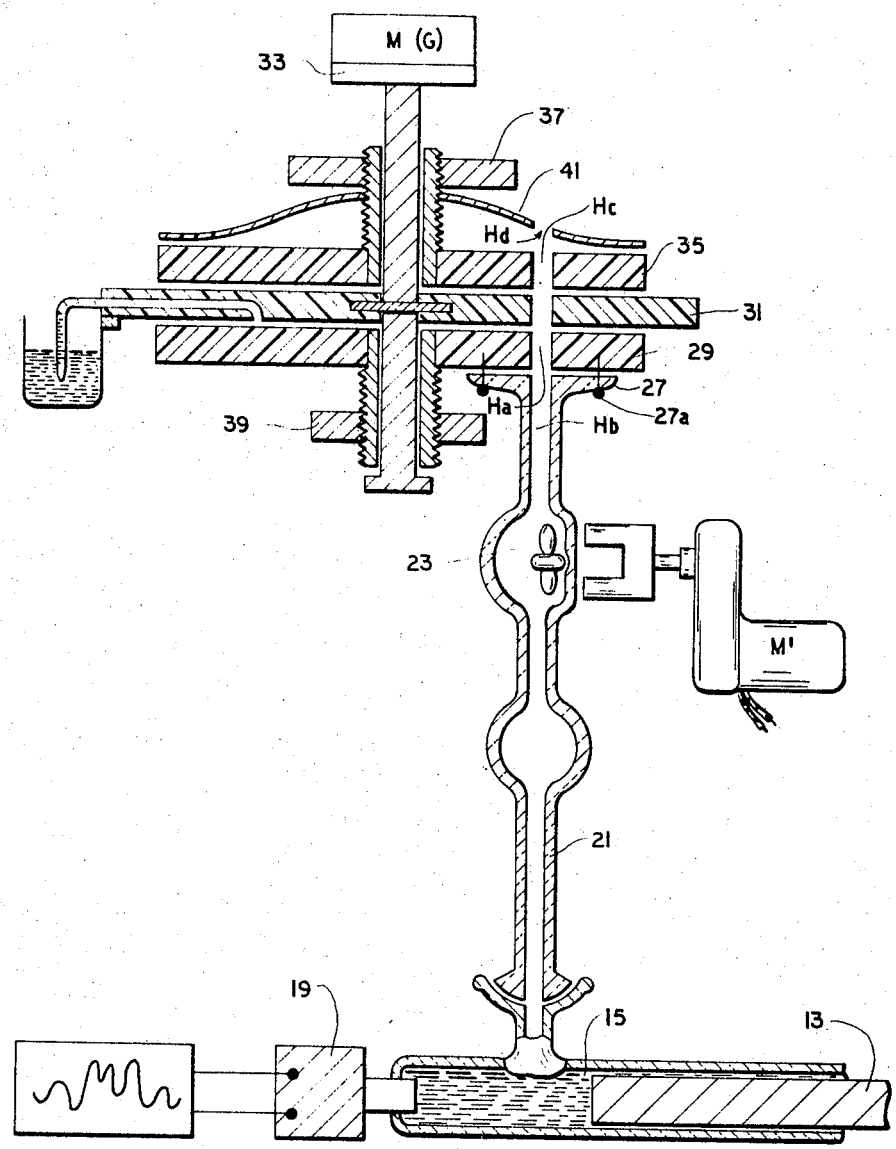
FIG. 1 shows a longitudinal cross-sectional explanation of the instrument contemplated herein.
Figure 2:
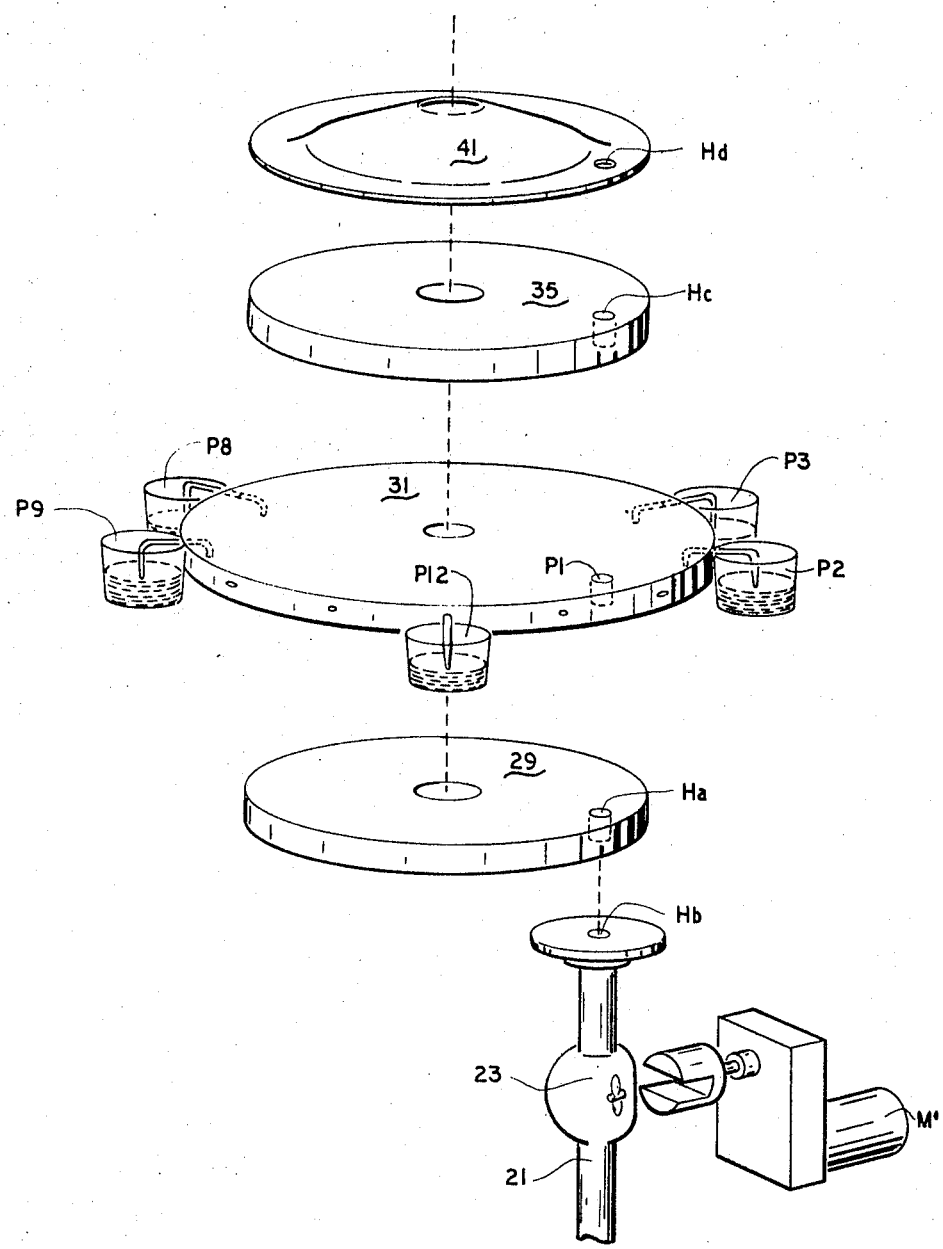
FIG. 2 is an exploded perspective view of a portion of the apparatus shown in FIG. 1.

The instrument shown in FIGS. 1 and 2 contains a moving arrangement with a work station. At one location on the moving arrangement there is an aperture for conducting a liquid-gas sample into a reaction chamber which has a separator for separating the gas from the liquid. The moving arrangement then moves another work location to the work station exposing a chamber to the gas. This chamber contains at least one absorbent. Meanwhile, the gas-liquid pressure is measured by a pressure transducer assembly during the reaction. The difference in the measured pressure before and after exposing the gas to the absorbent provides the partial pressure of the particular gas contained in the sample.

The instrument includes a plunger 13 operated by a servomotor M(S) which can move the plunger forward or backward as required. A hand operated wheel is also supplied so that the plunger can also be moved by hand when desired. This is advantageous in initially setting up the instrument and filling it with mercury or for making adjustments before an analysis is carried out. The plunger 13 is disposed in a barrel 15 full of mercury. The plunger 13 is sealed by a Teflon seal 54a (see FIG. 6), which permits the plunger to move back and forth without air leakage. The plunger 13 is attached to the servomotor M(S) by antibacklash gears so that a definite volume is displaced each time the plunger moves a definite distance. A pressure sensitive assembly namely a pressure transducer or strain gauge 19 is attached to and sealed into the barrel 15 to measure changing pressures. The barrel may be disposed in a horizontal or vertical mode. The pressure measuring device or strain gauge 19 is attached to a commercially available recorder or print-out device of standard design to record the pressure. The barrel communicates with an elongated glass tube 21. This tube 21 may be disposed at right angles to the plunger 13 and barrel 15 as shown in FIGS. 1 and 3, or may be disposed as an extension thereof as shown in FIG. 5. In glass tube 21 is a mixing or reaction chamber 23 with a flat side on which rests a spinner, i.e., a piece of paramagnetic wire of soft iron or a platinum cobalt alloy. This spinner 25 is held in place by a magnet 26 placed near the flat side so that when it is rotated by a small motor M', the spinner rotates. This type of spinner is known in the art as a magnetic stirring device. The top of the glass tube is flanged 27 sealed with a clamp 27a and cemented to a stationary support plate 29, preferably made of an inert material such as stainless steel or Teflon. This plate is ground to an optical flatness on top so as to form part of a valve which can be vacuum tight. This plate has a single hole $H_a$ of ⅛ inch in diameter aligned with the opening of the glass tube $H_b$ at the top. Disposed on top of this stationary support plate is a sample and reagent plate 31. This plate 31 is movable and ground top and bottom to an optical flatness. It is also preferably made of an inert material such as Teflon. This sample and reagent plate 31 can be rotated in one direction or back and forth by means of a drive operating through a Geneva movement 33 including a drive motor M(G) which permits aligning of the positions in this plate accurately. On top of this plate is a stationary covering plate 35 whose bottomside is ground to an optical flat. This stationary plate has one hole $H_c$ ⅛ inch in diameter which aligns with the opening in the glass tubing. The three plates are pressed together by means of two tightening screws 37 and 39. A spring metal washer 41 with a single ⅛ inch hole $H_d$ which aligns with the glass tube opening and the openings on the stationary cover and support plates is disposed below the top tightening nut so as to maintain tension between the three plates. Rotation of the center plate does not permit air to seep in from the sides and the combination of the three plates acts as a multiple place valve, permitting communication of the glass tube with any of 12 positions $P_1$ to $P_{12}$ shown in FIGURE 2. Position No. 1 communicates with the outside and permits addition of a measured sample. Positions $P_2$, $P_3$, $P_5$, $P_6$, $P_7$, $P_9$, $P_{11}$, and $P_{12}$ permit communication with reagent containers which are attached to the movable plate in one form of the invention. Positions $P_4$, $P_8$ and $P_{10}$ are seals which permit a vacuum to be formed in the glass tube when the sample and reagent plate is moved to those positions and the plunger retreats. In practice, the glass tube communicates with the barrel, and the barrel is filled with mercury or other inert nonvolatile liquid.

In operating the instrument, a sample is deposited, when the sample and reagent plate is at position $P_1$. Rotation according to a fixed schedule permits the addition of reagents to liberate the gases and movement to a sealed position. With the movement of the plunger back to a fixed volume between the sample and reagent plate and the meniscus of the reagents, the recorder or print-out instrument is activated to record the pressure. Movement of the plunger forward restores atmospheric pressure. Rotation of the Teflon sample and reagent plate permits the addition of a chemical absorbent. Movement is made to a sealed position. The plunger moves to the preset previous position and a second pressure is recorded. The difference is a measure of the gas absorbed and thus the gas in the original sample. Other positions are provided for ejecting the spent specimen, cleaning the instrument and restoring it to its initial position.

In the starting position the mercury extends from the glass tube to the brim of the hole in the stationary support plate. Sample size is exactly the size required to fill the space provided by the hole in the sample and reagent plate. This space then can be varied with shims so as to be the volume of the specimen applied. After each cycle the plunger is in the same position. For this reason the plunger is always measuring a volume and its dimensions are designed in accordance with the volumes being measured. In effect then, the plunger movement serves the purposes of a micro buret for measuring volumes.

In one variation the reagent containers are stationary being connected by flexible tubing to the outlet parts of the sample and reagent plate. In this case the plate moves from station to station to complete an analysis. The Geneva movement then reverses to bring it back to the original position, thus preventing the tangling of the tubing.

FIGURE 4 shows the system of scheduling the movement of the various parts of the apparatus. The turning of a synchronous programming motor M(P) turns cams 43, 45, 47, etc., acting on switches $43_s$, $45_s$, $47_s$. These switches activate the recorder-printer at definite intervals as well as other components. The Geneva movement control schedules the movement into position of the stations and the time required to remain there. Two controls for the plunger schedule its movement forward or backward and the distance it travels. The forward motion is not actuated when the backward motion occurs and vice versa. The control for the magnetic stirrer runs from this cam device at predetermined stated intervals and for definite times.

Teflon strain gauge 19 is a commercially available item. The Teflon gauge 19 is sealed into a Teflon support 56 which fits snugly into the glass making an air tight seal. This Teflon plug is scored with circles on the outside for flexibility and it is slightly wedge shaped. When pressed tight against the glass by the screw tightener it forms an effective seal. The whole is mounted on a metal frame $58b$. The rear of the barrel presses on a rubber gasket which is supported by a metal stop in the frame. Thus the plunger moves free in the mercury and the volume displaced is determined by the movement and diameter of the plunger.

FIGURE 5 shows the instrument mounted in a vertical mode. The advantage of this mode is that any air bubbles trapped in the barrel must move upwards.

In the vertical mode, the motor M(S) driving the plunger is under the instrument which is supported on a gasket $17a$. The plunger $13a$ moves vertically in barrel $15a$. The strain gauge $19a$ is mounted on the side of the instrument under the section having the reaction chamber. Glass tube $21a$ containing the reaction chamber is disposed as an extension of barrel $15a$. The instrument in both modes should have a hand drive consisting of a crank C with appropriate bevel gears G to drive the instrument by hand when required.

The plunger and barrel arrangement may be constructed in a manner similar to that described in U.S. Patent No. 3,717,722 and pending application Ser. No. 289,680 previously mentioned. When so constructed, this portion of the instrument includes a barrel $15b$ for the drive fluid, and a stainless steel or glass plunger $13b$ in the barrel. The barrel $15b$ is preferably of glass, sealed at one end and ground flat at the other end. The plunger moves forward and backwards in the barrel to displace the drive fluid usually mercury although other nonvolatile liquids such as silicone oils may be used. The plunger enters the barrel $15b$ through a seal 54 preferably made of Teflon. This seal fits close to the barrel and has annular rings cut into it to make it more flexible and to permit the barrel to slide smoothly in and out over the seal up to a flange $54a$ on the seal having a flat surface so that when the end of the barrel is pushed against it a seal is made. Over the sealed end of the barrel is a tapered screw cap 55, with a hole $55a$, designed to engage tapered threads $54b$ on seal 54.

The barrel and plunger arrangement is held in place by an assembly of supporting members. Thus, there is a first transverse support 57 which in turn is connected to longitudinal tie rods $58a$ and $58b$ by set screws 59. Seal 54 is held by second transverse support 60 also coupled to tie rods $58a$ and $58b$ while plunger $13b$ is supported outside of the barrel by third transverse support 61, this transverse support unlike the others glides over or along tie rods $58a$ and $58b$ according to the movement of the plunger in and out of the barrel. Plunger $13b$ has a flanged end 62 held to third transverse support 61 by a set scew $62a$ acting on a rubber washer 63. Third transverse support 61 and plunger $13b$ are moved by a threaded rod 64 which moves into the hollow of the plunger as drive wheel 65 is rotated. This serves to balance support 61. When turned one way, support 61 and plunger $13b$ advance into the barrel while if turned the other way, the plunger moves out of the barrel. In this way the mercury drive fluid is raised or lowered in the upper part of the instrument. To facilitate the gliding of support 61 along tie rods $58a$ and $58b$, bearings 66 are provided.

To support threaded rod 64, a fourth transverse support 67 having a bearing 68 is provided, while to turn wheel 65 by hand, a handle 69 is provided. For motor drive of threaded rod 64 there is a chain drive 70 driven by a chain 71 and a motor 72.

Mounted in the barrel $15b$ is a transducer $19b$ wherein the pressure sensitive end 73 communicates with the outer end of barrel $15b$. Transducer $19b$ is sealed in the barrel $15b$ by a Teflon plug 56. This plug 56 in turn is held in place by a knurled tightening screw 74 in first transverse support 57. The transducer $19b$ pasess through tightening screw 74. Leads from the transducer $19b$ connect the transducer to the print-out device. The print-out device usually has a readout.

EXAMPLE #1 ($CO_2$ CONTENT)

The instrument is filled with mercury to the brim of the hole in the stationary support plate. A sample of serum or blood from a capillary tilter of the order of 10–100 microliters is added by having the capillary tilt and dip into the sample hole before ejecting the specimen. Loading can also be done from a pipet by hand. At this stage the movable sample and reagent plate is in position so that the hole for the sample lines up with the hole in the stationary support plate and covering plates and the hole in the spring plate position $P_1$. The instrument is activated and by means of the Geneva movement the reagent carrier (position $P_2$) rotates into place. This carries a solution of 3 M lactic acid saturated with octyl alcohol to prevent foaming. The plunger is activated and retreats by means of the motor and antibacklash gears to deliver exactly the same volume as the original specimen chosen. The sample and reagent plate now rotates to reagent carrier position $P_3$ which is filled with mercury. The plunger retreats to deliver 0.1 ml. of mercury into the chamber. At this stage the sample has been washed in by the lactic acid and the lactic acid has been washed in by the mercury. Sample and reagent plate now rotates to position $P_4$ which is a blank position, sealing off the instrument. The plunger now retreats a volume of 0.5 ml. The spinning bar spins for one minute to mix the reagents. The instrument is allowed to rest for 30 seconds while the pressure is now recorded on the recorder or print-out device. At this moment, the plunger is activated and advances 0.5 ml. or until the strain gauge senses atmospheric pressure when it is stopped. Sample and reagent plate now rotates to position $P_5$ so that it communicates with a 3 M solution of sodium hydroxide. The plunger retreats so as to sample the same volume as the original sample. This is washed in with 0.1 ml. of mercury held at position $P_6$. The sample and reagent plate now moves to position $P_7$ which is a blank position. The plunger moves back a volume of 0.5 ml. the spinner mixes the reagents to absorb the carbon dioxide and the pressure is recorded as before. The plunger now advances to atmospheric pressure and contents are ejected at position $P_8$ into an empty container carried on the sample and reagent plate. At position $P_9$ 1 milliliter of water is sampled and ejected at position $P_{11}$. Position $P_{10}$ is skipped in this procedure. At this position the plunger continues to advance ejecting mercury until it is back to its initial position of the test. The hole in the stationary support plate is filled with mercury. The sample and reagent plate moves to position $P_1$ which is the original starting position. Position $P_{12}$ is by-passed in this procedure. In actual practice 12 positions (30° apart) are provided so that the instrument can be used for other tests which require more positions. For this procedure only 10 stations are required.

The difference in pressure before and after absorbing in alkali multiplied by a factor to correct for temperature and other constant conditions yields the $CO_2$ content. The factor depends upon the units decided upon in reporting the result. Air entering the instrument at sample position $P_1$ is of no consequence since the difference in pressure actually measures the $CO_2$ absorbed in alkali.

EXAMPLE #2 (OXYGEN IN BLOOD)

In this analysis the same general procedure is followed. The sample is introduced at the initial position as for $CO_2$, and the instrument will automatically wash in a dilute acidified solution of potassium ferricyanide followed by mercury to convert the hemoglobin to methemoglobin and to liberate oxygen. The carbon dioxide is then absorbed as before with alkali and a pressure reading taken. Sodium hydrosulfite is added to absorb the oxygen and a second pressure reading is taken. Both in the method of Example #1 and in this method these pressures are below atmospheric pressure since the gases are liberated under vacuum. The instrument is washed out as before and returned to its original position. Since one additional reagent, washed in with mercury is needed, all 12 positions are used in this test. A blank is run using distilled water in place of the blood to correct for oxygen introduced when the sample is added to the instrument. Readings are taken at the three blank positions $P_4$, $P_7$ and $P_{10}$. The difference in pressure between $P_4$ and $P_7$ gives the $CO_2$ in the sample. The difference in readings between $P_7$ and $P_{10}$ give the oxygen in the sample when multiplied by an appropriate factor.

It is to be observed therefore that the present invention provides for an instrument for use in assaying samples of gas contained in liquids and includes a moving arrangement 31 having a plurality of work locations $P_1$ to $P_{12}$, at least one of which is an aperture through which a sample of a liquid-gas mixture can be introduced into the apparatus; a reaction chamber 23 to which the sample is introduced containing a separator for separating the liquid and the gas, and a presure transducer assembly including a pressure gauge 19 connected to a barrel 15 having a plunger 13 and a glass tube 21 connected to the reaction chamber 23. The pressure is measured when the sample is first introduced to the reaction chamber 23 through the aperture and, after being exposed to a second work location on the moving arrangement which second work location contains an absorbent chamber for absorbing the gas. The gas pressure is measured on a pressure sensitive transducer or pressure gauge 19 having a pressure sensitive surface of from 0.3 to 4 sq. cm. with means for translating the resultant pressure into an electric current which can be recorded on an electric recording machine.

The movable plate 31 is positioned sequentially by a Geneva movement driven by motor M(G) attached to this plate through an axle pinned to this movable plate. The plunger is moved back and forth precisely by a servomotor drive M(S) with antibacklash gears. The instrument is programmed by means of series of cams driven by a synchronous motor M(P) which activate the Geneva movement, the servomotor and the recorder or print-out device by means of microswitches.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An instrument for use in automatically assaying the gas content of liquid samples comprising in combination:

(a) an automated moving arrangement including a plurality of sequentially disposed work locations at least one of which provides an aperture to the instrument, and at least another of which is a chamber for containing a gas absorbent;

(b) means for sequentially bringing these work locations to a work station;

(c) a reaction chamber including two outlets one of which can be brought in communication with a plurality of work locations, the other communicating with a displacement plunger moving in a sealed barrel;

(d) a servomotor whose extent of movement and direction is programmed by a synchronous motor operating through cams and microswitches, said servomotor moving said displacement plunger in said sealed barrel in order to admit or expel samples or reagents and for pressure adjustment in the reaction chamber;

(e) a pressure sensitive assembly in communication with said reaction chamber for recording changes in presusre in said reaction chamber as said work locations are presented to said work stations, whereby, by measuring the pressure of the gas liberated from a sample treated with a reagent when a vacuum is formed in the reaction chamber, and then measuring the pressure in the reaction chamber at the same volume after being exposed to another work station admitting a gas absorbent, the difference in pressure is a measure of the amount of gas absorbed.

2. The instrument claimed in claim 1 wherein the pressure sensitive assembly is a strain gauge.

3. The instrument of claim 1 wherein the pressure sensitive assembly is a pressure transducer.

4. The instrument claimed in claim 1 wherein a magnetic stirrer is provided in the reaction chamber.

5. The instrument claimed in claim 2 wherein a magnetic stirrer is provided in the reaction chamber.

6. The instrument claimed in claim 3 wherein a magnetic stirrer is provided in the reaction chamber.

7. The instrument as claimed in claim 1 with internal compartments of the instrument filled with an inert nonvolatile liquid.

8. The instrument as claimed in claim 2 with internal compartments of the instrument filled with an inert nonvolatile liquid.

9. The instrument as claimed in claim 3 with internal compartments of the instrument filled with an inert nonvolatile liquid.

10. The instrument of claim 1 where means for positioning said displacement plunger by hand movement of a wheel is provided in addition to the servomotor drive.

11. An instrument for measuring the gas content of liquid samples which comprises in combination:
  (a) a plunger communicating with a sealed barrel which can contain an inert nonvolatile liquid, said barrel communicating with a pressure sensitive assembly which communicates pressure changes to a recording device;
  (b) a servomotor connected to said plunger by antibacklash gears for precisely positioning said plunger;
  (c) an elongated reaction chamber containing a magnetic stirrer for mixing reagents, said sealed barrel communicating with one end thereof, the other end of the reaction chamber communicating with means for adding reagents sequentially to said reaction chamber through an opening which can be sealed so that a vacuum can be created in the reaction chamber.

12. The instrument claimed in claim 11 wherein said pressure sensitive assembly is a strain gauge.

13. The instrument claimed in claim 11 wherein said pressure sensitive assembly is a pressure transducer.

14. The instrument claimed in claim 11 where means for positioning said displacement plunger by hand movement is provided in addition to the servomotor drive.

15. An instrument for use in assaying samples of gas contained in liquids, comprising in combination,
  (a) a moving arrangement including a plurality of sequentially disposed work locations at least one of which provides an aperture to the instrument, and at least another of which is a chamber for containing an absorbent material;
  (b) means for sequentially bringing these work locations to a work station;
  (c) a reaction chamber including two outlets one of which can be brought in communication with said work station of said moving arrangement and the other with a displacement plunger to bring samples and reagents into the reaction chamber;
  (d) a servomotor activated by a synchronous motor and cam arrangement which moves a plunger back and forth so as to move sample and reagents into the reaction chamber and adjust the volume of free space in said reaction chamber to a fixed volume; and
  (e) a pressure transducer assembly in communication with said reaction chamber for recording the pressure in said reaction chamber;

whereby, by measuring the pressure of the sample when first introduced to the reaction chamber, and after being exposed to the other work station having the absorbent material, the difference in pressure is a measure of the pressure of the absorbed gas.

16. An instrument as claimed in claim 15, said moving arrangement including a turntable having additionally thereon a plurality of work locations some of which have material-containing chambers and some of which are blanks to seal the reaction chamber from the atmosphere.

17. An instrument as claimed in claim 16, said reaction chamber being disposed in an elongated tube intersecting the plane of rotation of said turntable, each of said work locations including an aperture, and sealing means between said turntable and said elongated tube permitting communication therebetween only at said work station.

18. An instrument as claimed in claim 17, said pressure transducer assembly including a barrel for holding mercury, a plunger for moving said mercury in the barrel and a pressure transducer for measuring the pressure on said mercury, said barrel being coupled to said elongated tube so that said transducer measures the pressure in said reaction chamber.

19. An instrument as claimed in claim 15 including a magnetic stirrer in the reaction chamber for mixing solutions therein.

References Cited

UNITED STATES PATENTS

| | | | |
|---|---|---|---|
| 2,680,060 | 6/1954 | Natelson | 23—259 XR |
| 3,408,166 | 10/1968 | Natelson | 23—259 XR |

MORRIS O. WOLK, *Primary Examiner.*

R. E. SERWIN, *Assistant Examiner.*

U.S. Cl. X.R.

23—254, 259